Sept. 24, 1963  O. S. CARSON ETAL  3,105,174
ELECTRICAL SIGNALLING SYSTEMS
Filed Oct. 5, 1960  2 Sheets-Sheet 1

Oliver Samuel Carson
George McMurtry
Inventors
By Cushman, Darby & Cushman
Attorneys

United States Patent Office 3,105,174
Patented Sept. 24, 1963

3,105,174
ELECTRICAL SIGNALLING SYSTEMS
Oliver S. Carson and George McMurtry, Belfast, Northern Ireland, assignors to Short Brothers & Harland Limited, Belfast, Northern Ireland, a British company
Filed Oct. 5, 1960, Ser. No. 60,608
Claims priority, application Great Britain Oct. 15, 1959
6 Claims. (Cl. 317—146)

The present invention relates to electric signalling systems and particularly though not exclusively to such systems used for test purposes.

In checking or testing the performance of an electric or electro-hydraulic control system it has been proposed to inject into the system test signals of predetermined characteristics and monitor and check the response of the system. Such test signals preferably take the form of a train of pulses of predetermined amplitude, duration and frequency, and it is an object of the present invention to provide a pulse generator for generating such pulses, which can be operated by connection to a D.C. or A.C. supply.

According to the present invention the pulse generator comprises an input circuit connected to a voltage source, which charges a capacitor. A transistor switching device is so connected as to be non-conducting except when the capacitor reaches a predetermined state of charge, whereupon it conducts to cause discharge of the capacitor through an output circuit so producing a pulse in the output circuit. The frequency of the output pulses depends on the time constant of the capacitor charging circuit and the pulse duration depends on the time constant of the capacitor discharge circuit. Both frequency and duration can be controlled by varying the resistance of the input and output circuits respectively.

Some embodiments of the invention will now be described by way of example with reference to the accompanying drawings in which FIGS. 1 to 5 are circuit diagrams of pulse generators according to different embodiments of the invention.

Figure 1:
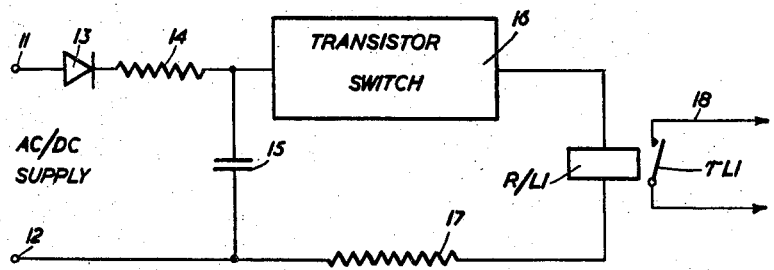

Referring first to FIGURE 1 an input circuit of the pulse generator comprises a pair of input terminals 11, 12 to which an A.C. or D.C. supply is, in operation, connected, a rectifier 13 and a resistor 14 connected in series between the input terminal 11 and one plate of a capacitor 15, and a direct connection between the other input terminal 12 and the other plate of the capacitor 15. A semi-conducting switching device 16, which takes the form of a semi-conducting diode as hereinafter explained, is connected in series with the winding of a relay R/L1 and a resistor 17, across the capacitor 15.

The semi-conducting diode constituting the switching device 16 is a four layer diode or as it is sometimes called a PNPN switching diode. For a description of this diode reference may be made to an article in "Control," vol. 3, No. 23, May 1960, at pages 154–155, published by Rowse Muir Publications Ltd., London, and to an article in "Communication and Electronics," part I, No. 47, March 1960, of the American Institute of Electrical Engineering.

The polarity of the diode device 16 in relation to the rectifier 13 is such that the device 16 is non-conducting except when the charge on the capacitor 15 reaches a predetermined level, whereupon it conducts and discharges the capacitor 15, discharge current flowing through the winding of the relay R/L1.

The relay is provided with a pair of contacts $rL_1$, connected in a further circuit 18, and the arrangement is such that the contacts are normally open, and close when the relay R/L1 becomes energised by the discharge current.

Initially, with the supply disconnected from the input circuit 13, 14 the diode device 16 is non-conducting and the relay R/L1 de-energised. Upon connection of the supply, the capacitor 15 charges up and, after a time determined by the resistance of the input circuit resistor 14 and the capacitance of the capacitor 15, the charge reaches a level which causes the device 16 to conduct. The capacitor 15 then discharges through the device 16 and the winding of the relay R/L1, causing the relay to operate and close its contacts $rL1$. After a further time determined by the resistance of the discharge circuit and the capacitance of the capacitor 15, the charge on the capacitor 15 falls to a level at which the device 16 ceases to conduct. The relay R/L1 releases and its contacts open. Clearly, the operation is then repeated until the supply is disconnected.

The relay contacts $rL1$ in the further circuit 18 generate a succession of square-wave pulses by their alternate opening and closing.

Where multi-channel control systems are to be tested, that is to say, systems which include a plurality of parallel channels providing a common control for a plurality of controlled elements, it is often desirable to supply test signals to all the channels simultaneously and check and compare the responses of the controlled elements. It is therefore preferable to provide a generator which can be used to feed a plurality of channels with pulses simultaneously.

Figure 2:
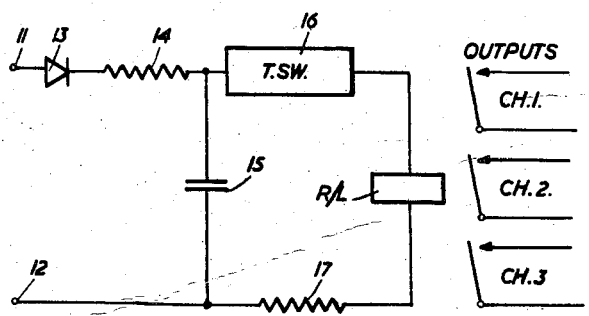

With the object of meeting the afore-mentioned requirement in a simple manner, the relay in the embodiment hereinbefore described is substituted by a relay R/L as shown in FIG. 2, the relay R/L having a plurality of pairs of contacts three of which are shown, the number of pairs of contacts being equal to the maximum number of channels which is likely to be encountered. All the contacts are arranged to operate simultaneously and each pair is connected in a separate circuit.

Figure 3:
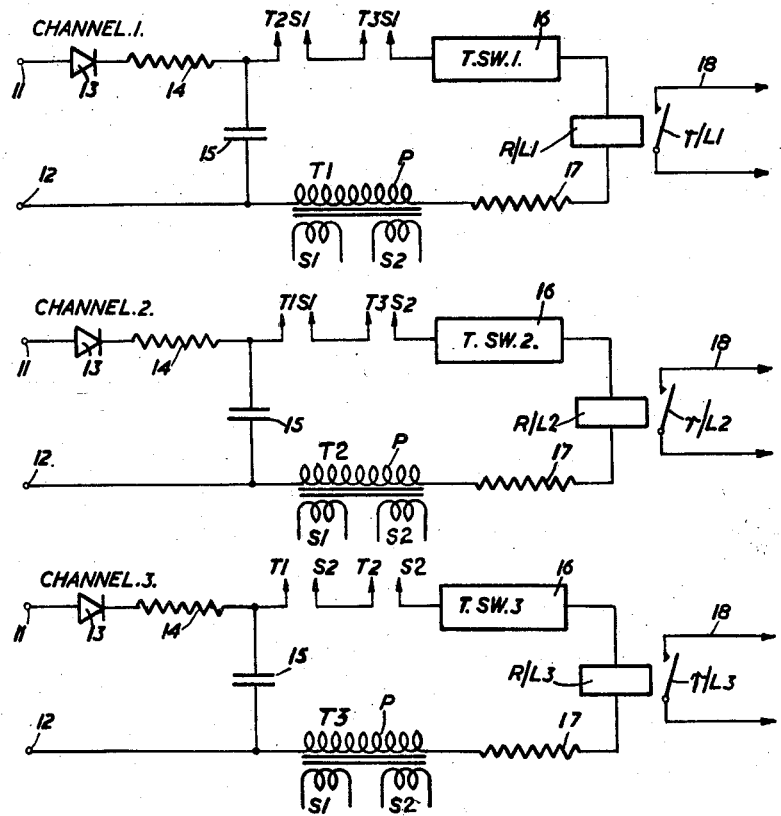

An alternative embodiment of the invention, for multichannel testing, is shown in FIGURE 3. A pulse generator as hereinbefore described is provided for each of three channels and a synchronizing arrangement now to be described is provided for ensuring that the test pulses generated by the different generators appear simultaneously.

The synchronizing arrangement comprises three transformers T1, T2 and T3 associated with the three generators. Each transformer comprises a primary winding P connected in series in the discharge circuit of the generator and two secondary windings S1, S2 inductively coupled to the primary winding P. The secondary windings S1, S2 associated with the primary winding P of each channel are respectively connected in the discharge circuits of the generators for the other channels. The arrangement of the windings is such that discharge current flowing in the discharge circuit of any one of the generators induces in each of the other discharge circuits a voltage which assists that developed by the capacitor 15 and tending to produce conduction in this circuit. So arranged, when all the generators are connected to the supply then the first to discharge its capacitor causes all the others immediately to discharge their capacitors. In this way synchronization of all the output pulses is achieved.

The advantage of the last-descibed embodiment over that employing a plurality of contacts on the relay of a single generator is that each channel may be tested separately if and when desired, the connection of the supply to one generator resulting in the generation of test pulse in that generator only.

Figure 4:
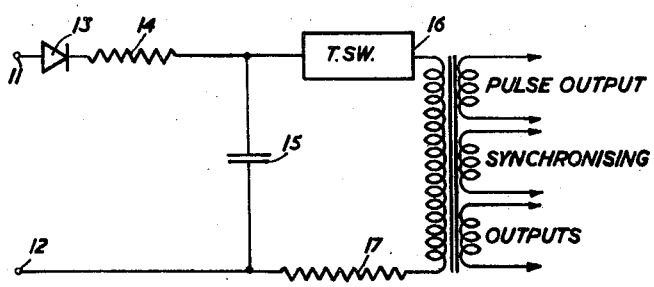

The last-described embodiment can be made to operate to closer limits by substituting for the relay in each generator an additional secondary winding inductively coupled to the primary winding in the discharge circuit. This modification is shown in FIG. 4 of the drawing.

Figure 5:
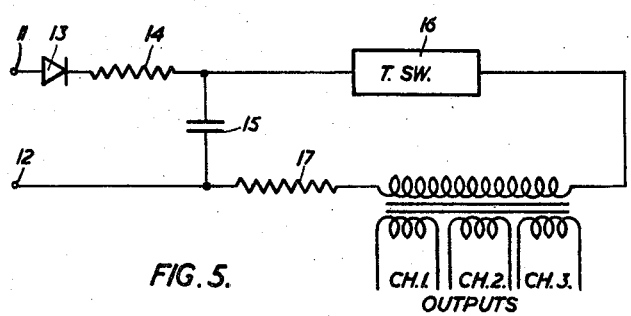

Yet another embodiment of the invention, for multi-channel testing, is shown in FIG. 5 of the drawing. The relay of the first described embodiment is substituted by a transformer having a primary winding connected in series in the discharge circuit and a plurality of secondary windings for generating separate output test pulses for application to the respective channels.

We claim:

1. Pulse generating apparatus for a multi-channel control system, comprising a respective pulse generator for each channel and a synchronizing arrangement for causing pulses produced by the different generators to appear simultaneously in the different channels, each pulse generator having an input circuit including capacitor charging means adapted to be connected to a voltage source, a capacitor connected to be charged by said charging means, means including load means for discharging said capacitor and substantially controlling the discharge time constant therefor, and a semi-conducting switching device, said device and discharging means being serially coupled together and across said capacitor with said device being so connected as to be non-conducting except during successive spaced time periods each of which follows the charging of said capacitor to a predetermined state of charge which causes said device to conduct and effect discharge of said capacitor through said discharging means once during each of said time periods each of which has a duration determined by said discharge time constant to produce a succession of pulses in said load means at regular intervals as long as the input circuit is connected to said voltage source, said synchronizing arrangement comprising a primary winding connected in series in the discharge circuit of each generator and a plurality of secondary windings which are coupled to each primary winding and which are equal in number to the number of channels less one, the secondary windings associated with the primary winding of each generator being respectively coupled to or connected in the discharge circuits of the generators for the other channels, the arrangement of the windings being such that the current flowing in and the discharge circuit of any one of the generators induces in each of the other discharge circuits a voltage which assists that developed by the capacitor and tending to produce conduction in that other circuit.

2. Apparatus according to claim 1, and further including for each generator a respective relay having its coil constituted by a further secondary winding coupled to the said primary winding in the discharge circuit of the respective generator.

3. Apparatus according to claim 1, wherein the said switching device of each generator is a respective PNPN diode.

4. Pulse generating apparatus for a multi-channel control system comprising a plurality of individual, recurring pulse generators each of which includes: an input circuit adapted to be connected to a voltage source, a capacitor connected to be charged by current from said input circuit, an output circuit, and means coupling said capacitor and output circuit for repeatedly discharging said capacitor for a predetermined time each time it attains a predetermined charge to produce a succession of pulses in its output circuit at regular intervals as long as its input circuit remains connected to said voltage source; and synchronizing means in each of said output circuits coupled to each remaining output circuit for causing the pulses produced by the different generators to appear simultaneously in all of said output circuits, said synchronizing means comprising a plurality of primary windings respectively connected in series in said output circuits, there being inductively coupled to each said primary winding at least a number of secondary windings equal to the number of said output circuits less one, each output circuit having electrically coupled to it a said secondary winding from each remaining output circuit with the said electrical and inductive coupling being such that discharge current flowing in the output circuit on any one of said generators induces in each remaining output circuit a voltage which assists that developed therein by capacitor discharge.

5. Apparatus as in claim 4 and further including a plurality of further secondary windings respectively inductively coupled to said primary windings and otherwise decoupled from other than its respective said output circuit.

6. Apparatus as in claim 4 and further including a plurality of relays having respective coils respectively coupled to said primary windings for causing each of the simultaneously occurring output pulses to be of substantially square wave form.

References Cited in the file of this patent

UNITED STATES PATENTS

| 2,208,125 | Feingold | July 16, 1940 |
| 2,433,254 | Aiken | Dec. 23, 1947 |
| 2,435,027 | Blomberg | Jan. 27, 1948 |
| 2,947,916 | Beck | Aug. 2, 1960 |
| 3,048,710 | Shockley | Aug. 7, 1962 |

FOREIGN PATENTS

| 963,086 | Germany | May 2, 1957 |